(12) United States Patent
Edwards (10) Patent No.: US 8,017,057 B2
(45) Date of Patent: Sep. 13, 2011

(54) METHOD FOR MAKING A PRESSED PART WITH SEPARATIONS OR VOIDS

(75) Inventor: Mark S. Edwards, Newark, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 312 days.

(21) Appl. No.: 11/811,967

(22) Filed: Jun. 12, 2007

(65) Prior Publication Data

US 2007/0290402 A1 Dec. 20, 2007

Related U.S. Application Data

(60) Provisional application No. 60/813,812, filed on Jun. 15, 2006.

(51) Int. Cl.
  *B29C 45/14* (2006.01)
(52) U.S. Cl. ............... 264/319; 264/109; 264/316
(58) Field of Classification Search .......... 277/428, 277/496; 264/109, 319, 316; *B29C 43/42*
  See application file for complete search history.

(56) References Cited

U.S. PATENT DOCUMENTS

| | | | |
|---|---|---|---|
| 3,111,325 A | 11/1963 | Reiling | |
| 3,179,614 A | 4/1965 | Edwards | |
| 3,720,418 A | 3/1973 | Berg | |
| 4,189,161 A | 2/1980 | Grimm | |
| 4,206,930 A | 6/1980 | Thrane et al. | |
| 4,803,029 A | 2/1989 | Iversen et al. | |
| 5,628,519 A * | 5/1997 | Kakehi | 277/434 |
| 5,882,012 A * | 3/1999 | Niwa et al. | 277/407 |
| 5,988,649 A | 11/1999 | Van Ryper et al. | |
| 6,224,814 B1 * | 5/2001 | Abe | 264/328.12 |
| 6,328,834 B1 | 12/2001 | Rebstock et al. | |
| 6,534,622 B2 * | 3/2003 | Yamaguchi et al. | 528/170 |
| 2003/0122318 A1 * | 7/2003 | Yanagiguchi et al. | 277/534 |
| 2004/0104516 A1 | 6/2004 | Benson et al. | |
| 2004/0251634 A1 * | 12/2004 | Shimazu et al. | 277/434 |
| 2005/0156004 A1 | 7/2005 | Edwards | |

FOREIGN PATENT DOCUMENTS

| | | |
|---|---|---|
| DE | 1 231 420 | 12/1966 |
| EP | 1 785 264 A1 | 5/2007 |
| GB | 781377 | 8/1957 |
| GB | 1081675 | 8/1967 |
| JP | 2004-100809 * | 4/2004 |

OTHER PUBLICATIONS

PCT International Search Report and Written Opinion for International Application No. PCT/US2007/013964 dated Nov. 20, 2007.

* cited by examiner

*Primary Examiner* — Joseph Del Sole
*Assistant Examiner* — Kimberly A Stewart (57) ABSTRACT

The present invention is a process for producing molded parts from a polymeric powder or metallic powder, wherein the molded part has a separation or a void. The separation or void is formed by inserting a separator or void-forming material into the die cavity before, during or after filling the die cavity with the powdered molding material that is to form the pressed part. After the pressed part is formed the separator or void-forming material is removed to provide the separation or void.

12 Claims, 3 Drawing Sheets

METHOD FOR MAKING A PRESSED PART WITH SEPARATIONS OR VOIDS

CROSS-REFERENCE TO RELATED APPLICATION

This application claims the benefit of U.S. Provisional Application No. 60/813,812, filed Jun. 15, 2006.

FIELD OF THE INVENTION

The present invention relates to molded parts obtained from powders. More particularly, the present invention relates to a method for obtaining molded parts from powder compositions and placing a separation, or a void, or both in the molded part.

BACKGROUND OF THE INVENTION

Machinery parts and mechanical component parts such as seal and piston rings can be made using powder molding techniques such as compression molding. Moldable powders can be prepared from materials such as metals, ceramics, or polymers.

Polymers with very high melting or softening points do not flow readily, and therefore are not generally considered to be injection moldable. Often, powder molding techniques are the preferable method of manufacturing shaped parts from such polymers. However, because a non-melting powder typically does not flow and distribute itself in the mold as readily as a meltable, or thermoplastic polymer, features such as fine separations or wider gaps can be difficult to mold into the part. An example of a part requiring a separation would be a seal ring, where the separation allows the ring to be opened and placed on a shaft, or to allow for thermal expansion. Hereinafter, the terms "separation", "gap", and "joint" may be used interchangeably.

High temperature resins are increasingly replacing metals in the fabrication of machinery parts and mechanical components. As a result, significant reductions in production and replacement costs for the machinery parts and mechanical components have been realized. To replace metals in machinery parts and mechanical components, the high temperature resins should have high resistance to mechanical wear, surface stress, and extreme temperature conditions. Additionally, the performance characteristics of the high temperature resins should equal or exceed that of the metals being replaced.

Polyimides are particularly preferable high temperature resins because of their mechanical strength, dimensional stability, thermal stability, chemical stability, flame retardance, and dielectric properties. Polyimides, such as those described in U.S. Pat. No. 3,179,614 issued to Edwards on Apr. 20, 1965, can be used in a wide variety of commercial applications. The performance characteristics of these polymers under stress and at high temperatures have made them useful as bushings, seals, electrical insulators, thermal insulators, compressor vanes and impellers, pistons and piston rings, gears, thread guides, cams, brake linings, and clutch faces.

A desirable group of polymers suitable for use are those that retain desirable mechanical properties at high temperatures. Polymers in this group, however, often melt at very high temperatures or decompose without melting. In addition, their viscosities in the melt phase are extremely high. Therefore, these polymers are considered to be intractable, that is, non-melt processible. Thus, forming these polymers into shaped articles is expensive at best and difficult in many cases. For example, nylons of hexamethylene diamine and terephthalic acid exhibit excellent temperature resistance but cannot be melt-spun or molded because they decompose before their crystalline melting temperatures are reached. Similarly, many other substantially aromatic polymers such as polyimides of pyromellitic anhydride and aromatic diamines cannot be melt processed. Powder processing and sintering techniques have been used to process such intractable polymers into useable articles. Thus, in the context of the present application, "non-melt processible" refers to resin particulates that either have a melting transition temperature ("Tm") of at least 260° C., in the case of resin particulates that have a discernable melting point, or have no discernable melting point but are stable in temperatures up to at least 260° C.

Sealing rings have been made from a variety of materials, most commonly from metals such as cast iron, and various polymers. Polymers with good high temperature properties, low frictional coefficients, and reduced wear resistance have been found to be particularly useful in sealing ring applications. Since the ring is placed on a piston or shaft, and the ring material is often inelastic, a separation must be placed in the ring to facilitate application of and removal from the piston or shaft. The separation also allows thermal expansion and contraction of the seal ring. Sealing rings are used in mechanical devices for creating a seal between a shaft or rod and a bore, as for example in compressors, automatic transmissions, and power steering devices. A seal ring is generally of an open annular shape and can be mounted on a circumferential groove of a shaft or rod that is situated within a cylindrical housing. The function of the seal ring is normally to control the leakage of fluid from one side of the ring to the other side while allowing the shaft or rod to turn or pulsate within the cylindrical housing. Seal rings have been made with joints that allow the rings to expand or contract with expansion or contraction of the shaft or rod on which the seal ring is mounted, as occurs for example during thermal expansion or contraction of the shaft. The joints of such expandable seal rings have been made with various geometrical configurations and are generally a compromise between the functional requirements and the affordability of the ring. In most all designs it is preferable for the open separation between ends of the ring to be minimized when operating in the housing. Commonly known joint arrangements for seal rings include butt joints, scarf joints, and step joints. Some applications for these sealing rings are compressors, pumps, automatic transmissions, and power steering devices. The known methods for preparing separations in these rings are direct forming, machining or fracturing. Machining of such rings has been both tedious and labor intensive, resulting in higher part manufacturing costs. Furthermore, when a ring has been machined, material is actually removed from the ring such that when the machined edges are brought back into contact with each other, the ring is then "out of round" that is, no longer circular.

A semi-rigid ring, such as a Vespel® ring cannot be stretched over a shaft so as to be placed in a ring groove on said shaft. The ring, having the purpose of sealing a fluid, such as transmission fluid, has a high pressure side and a low pressure side. The ring, properly seated in the groove, should provide a seal, thus restraining the high pressure fluid from freely passing through the ring to the low pressure side. But in order to install the semi-rigid ring, the ring must have a separation to allow the ring to be spread (an increase in the effective diameter of the ring) so as to pass over the large shaft diameter and be placed in the smaller shaft diameter of the ring groove. A preferred ring separation is one that allows for ring diameter expansion/contraction in response to changing environmental conditions. A preferred ring separation would also maintain a constant sealing capability over the entire range of conditions it operates under. A preferred separation is one that has overlapping segments, such as in a step gap joint or scarf joint ring.

In U.S. Pat. No. 3,720,418 to Berg, a method for fracturing a ring is described wherein a "notch" is first etched or scored into the outer surface of a ring, and then the notched area is struck with a heavy object to create the fracture. U.S. Pat. No. 5,988,649 to Van Ryper et al. discloses a seal ring having a fracture line through its thickness to form opposing faces. U.S. 2005/0156004 to Edwards, discloses an improved fracturing device using a recessed pocket instead of support pins.

Parts with voids such as cavities, channels, chambers, etc. are typically produced by machining which again is tedious and labor intensive and results in higher part manufacturing costs.

It can be desirable to have a method for forming separations and voids in powder molded parts during a molding process. It can further be desirable to have an efficient method for forming separations in powder molded seal rings.

SUMMARY OF THE INVENTION

The present invention provides a process for compression molding a powdered metal or powdered resin to produce a metal or non-metal pressed part with a partial or complete separation partition or a void, pre-determined in the compaction process as the part is formed. This is accomplished by inserting a separator or void-forming material into a die cavity before, during, or after filling with powdered resin or powdered metal. The separator or void-forming material is placed at a location where the separation or void in the molded part is desired. In one preferred embodiment the separator material is in the form of a film or sheet. The separator or void-forming material may be shaped prior to insertion to give gaps or voids with various geometries. After pressing the part, certain separator or void-forming materials such as paper may be removed by carbonization to ash, in a curing or sintering process; other separator or void-forming materials such as metal may be physically removed.

In one aspect, the present invention provides a process for producing a pressed part with one or more separations in the part, the process comprising: (a) filling a die cavity in one or more steps with a powdered molding material; (b) inserting into the die cavity before, during or after said filling a separator material at one or more places at a location of desired separation of the pressed part; (c) compressing the powdered molding material in a mold to form the pressed part; (d) removing the pressed part from the mold; and (e) removing the separator material from the pressed part.

In another aspect, the present invention provides a process for producing a pressed part with one or more voids in the part, the process comprising: (a) filling a die cavity in one or more steps with a powdered molding material; (b) inserting into the die cavity before, during or after said filling a void-forming material at one or more places at a location of a desired void in the pressed part; (c) compressing the powdered molding material in a mold to form the pressed part; (d) removing the pressed part from the mold; and (e) removing the void-forming material from the pressed part.

BRIEF DESCRIPTION OF THE DRAWINGS

The invention will be more fully understood from the following detailed description, taken in connection with the accompanying drawings, in which.

DETAILED DESCRIPTION OF THE INVENTION

As used herein, the following terms shall have the following meanings:

(a) "compression molding" shall mean any method—including direct forming and sintering, isostatic molding, extrusion ram molding, and/or other methods known to one of ordinary skill in the art—for preparing parts from a polymer powder, non-polymer powder or mixture thereof by the application of either pressure alone or the simultaneous or sequential application of heat and pressure, whereby the powder is compacted to form a shaped article that has sufficiently high density to maintain that shape through subsequent processing steps;

(b) "direct forming" shall mean compression of a powder in a die or mold to produce a green or uncured part;

(c) "sintering" shall mean a process by which discrete particles are heated to form a coherent mass without melting;

(d) "carbonization" shall mean decomposition by heat of a material to ash;

(e) "end gap" shall mean a spatial separation between two opposing ends of a part;

(f) "joint" shall mean an area where parts of one or more articles are joined;

(g) "butt joint" shall mean a joint of two ends with no overlap of the ends;

(g) "step joint" shall mean an overlapping joint with a step geometry;

(h) "scarf joint" shall mean an in-line joint in the part comprising lapped ends having complementary engaging portions formed by angling, beveling, halving, or notching;

(i) "separator" shall mean a partition introduced to a powdered molding material in a mold;

(j) "separator material" shall mean the substance used in construction of the separator.

The present invention provides a method for advantageously preparing a pressed part with at least one separation, and/or at least one void. The method allows introduction of separation(s) during the molding process, and obviates the need for additional steps such as machining or fracturing to form separations.

In one embodiment, the present invention is a process for compression molding a powder. A preferred method is to insert a separator material, such as paper, into the powder filled die cavity before compression. In another embodiment, a separator material such as metal is inserted into the die cavity before the cavity is filled, or after the cavity is partially filled, after the cavity is filled.

The configuration of the separator material and its thickness and stiffness determine the form of the separation after compression molding and sintering. Paper or similar materials that are stiff enough to control the position and form of the separator material when inserted through the powder of the prefilled die cavity are preferred Such separator materials can also be used with a partially filled cavity before the filling is completed. Paper or similar materials provide the additional advantage of being reduce to carbon at the elevated sintering temperatures leaving a separation area of easily removed ash. Other separator materials such as metal can be removed after compression. The separator material may or may not be positioned so as to expose an upper and lower end of the separator material.

The powdered molding material is then compressed in a mold to form a pressed part using conventional compression molding techniques, and then removed from the mold. Sintering can be used to remove the separator material.

When not positioned to expose both the upper and lower end of the separator material, a pressed and sintered part must be processed through a final step, e.g., machining or fracturing, to complete the separation. Following the sintering process, the separation is exposed by simply applying enough force to displace one part of the pressed part, or in the case of a ring, the ring end from the other at the separation point. This step is eliminated when the separator provides a complete separation through the entire cross-section of the ring.

The invention also provides a process for producing a pressed part with at least one void. A process for producing a pressed part with one or more voids in said pressed part, said process comprising: filling a die cavity in one or more steps with a powdered molding material; inserting into the die cavity before, during or after said filling a void-forming material at one or more places at a location of a desired void in said pressed part; compressing the powdered molding material in a mold to form said pressed part; removing said pressed part from said mold; and removing said void-forming material from said pressed part.

The void can be formed with void-forming material, and is not limited to using film or sheet separator materials or void-forming materials. For example, tube, column or other shaped geometries may be used to introduce holes, i.e., voids in the part without the need for a post machining step. The voids can be in the form of cavities, channels, chambers or other forms with a variety of shapes. Channels can be used for example to enable cooling fluids to be passed through the part. The materials used for forming the voids are the same as those used to form the separations. The void-forming material is preferably selected from those materials that can be removed from the-pressed part by carbonization. The selection of the void-forming material also depends on the tolerances that can be permitted in the void dimensions. The stricter the tolerances, the greater the need for a void-forming material that is highly compressed and not distorted by the pressure of the molding. Compressed paper or rigid cardboard are two candidate void-forming material for such applications.

Also, the present invention provides for a process for producing a pressed part with at least one separation and at least one void.

The processes of the present invention will allow some parts to be direct formed by pressing and eliminates density gradients in the part and the need for secondary machining.

In one embodiment for forming a separation, a film material is strategically introduced into a resin powder of a filled, or partially filled, cavity prior to pressing the part. This is important since all voids can be easily and uniformly filled, and the film need not be very stiff to "cut" through the resin to be strategically placed in the desired location and position. When the resin is compressed to form the part the film "flows" with the resin, allowing very uniform densities within the part and in particular in the partition area. If the film should adhere to the resin, the film will be removed by decomposition in the sintering process. Therefore, the film acts as a physical partition in the resin powder such as does a section of the die or punch set but is flexible and will conform with the resin when compressed. When removed, the film leaves a very small gap separation between segments of the part without the need for machining or fracturing. The separator material may comprise metal, polymer, paper, cardboard, inorganic or ceramic. In the case of film materials which undergo thermal decomposition, the film would not be permanent, and is easily removed during the high temperature sintering process. The film may be inserted into the filled cavity either manually or by robotic assist from the open top of a cavity or strategically located perforation in the die wall. Preferably, a slit is located in the exterior die cavity wall through which the film is fed laterally into the filled cavity. In some instances, it may be advantageous to insert separator material at one or more places at a location of a desired separation. When the separator material is fed through the cavity wall, the upper and lower punches are used as shearing devices to cut the film from a continuous feed in preparation for the next cycle.

Figure 1:
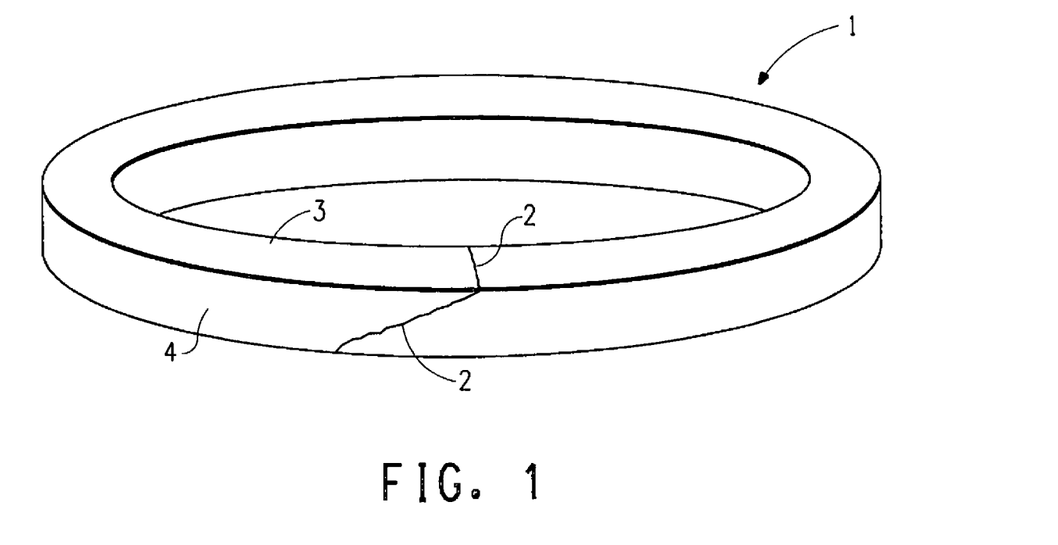
FIG. 1 shows a pressed ring prior to sintering with the edges of an angled separator material exposed.
Figure 2:
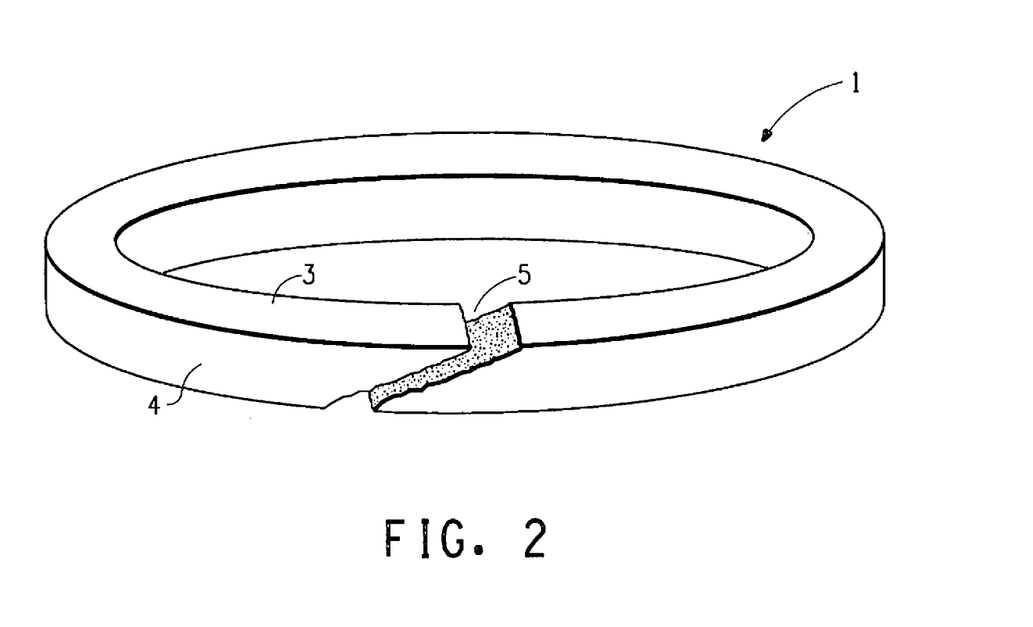
FIG. 2 shows the ring of FIG. 1 after sintering with the separator material removed and the ring slightly opened to more clearly show the separation

In the present invention, the separator material is not anchored to the mold. The nature of a non-anchored, thin-film separator material is such that the film can yield and move with the resin powder during compression, allowing powdered resin to flow and tightly pack around the separator material. As a result, finer separations of better quality may be achieved than with an anchored separator. An anchored separator is one which is an integral part of the mold, for example a metal tab built into the mold. A disadvantage of an anchored separator is the difficulty achieving tight packing up to the separator surfaces. Poor quality separations can result. During the molding process, the separator material used for the present invention is subjected to stresses from contact with the flowing and compressing resin. Depending on the type of separator material, these stresses can result in a slight buckling or irregular wavy pattern that is shown along the edge of the separator in FIG. 1 which shows the edge of the separator material in the "green" part before sintering. The irregularities in the separator material impress a corresponding pattern in the adjacent compressed resin as shown in FIG. 2. The two ends of the part have facing, complementary patterns that "mate" precisely when the ends are brought together.

In the case of a seal ring, the angled mating surface results in a circuitous path resisting the flow of pressurized liquid or gas, and reducing leakage. A similar effect is achieved with a v-shaped, step and other separations. It is possible to form an angled or v-shaped separation by machining, but the surfaces would be smooth. With selection of the proper cutting technique a roughened machined surface could be generated, but said surface would not be a precise mating surface, as in the present invention.

Figure 3:
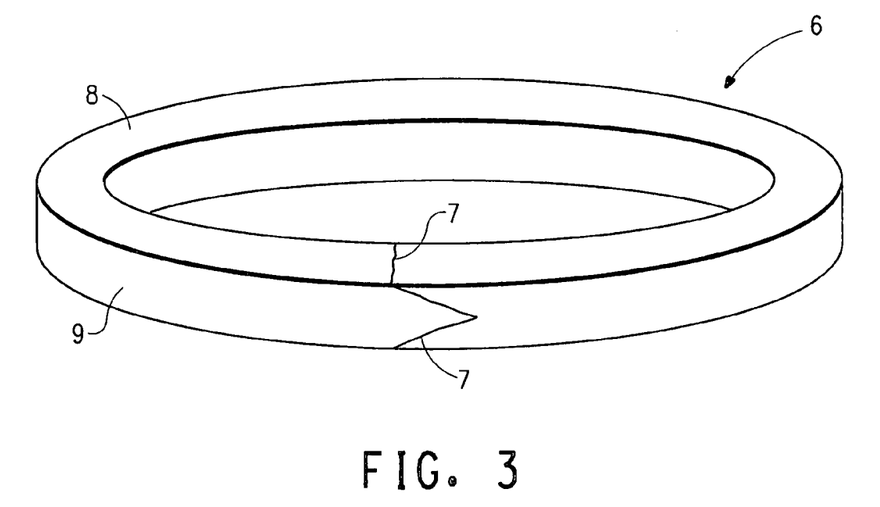
FIG. 3 shows a pressed ring prior to sintering with the edges of a V-shaped separator material exposed.
Figure 4:
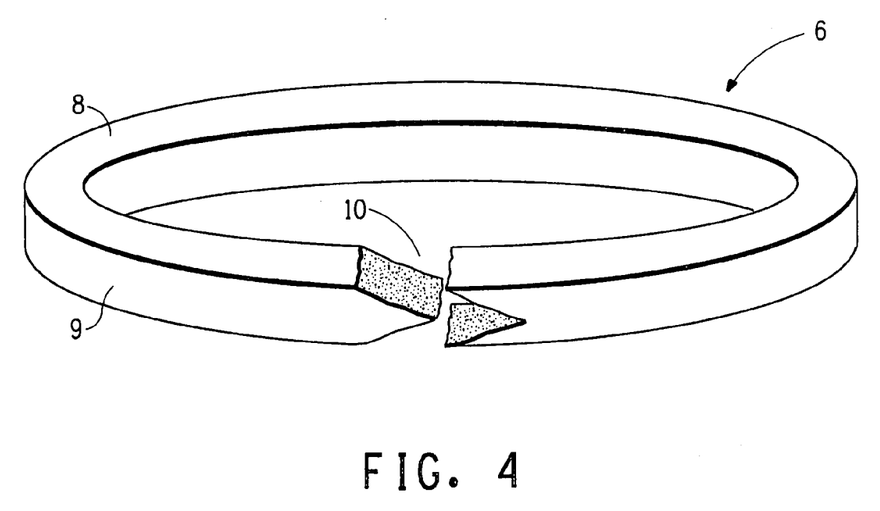
FIG. 4 shows the ring of FIG. 3 after sintering with the separator material removed and the ring slightly opened to more clearly show the separation.
Figure 5:
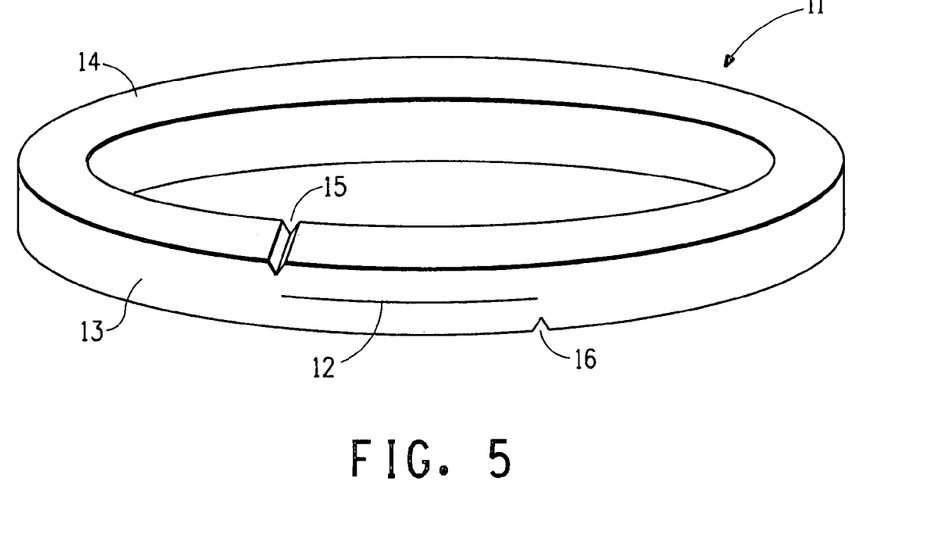
FIG. 5 shows a pressed ring prior to sintering with the edge of a horizontal sheet separator material exposed and scorings on the top and bottom surfaces.
Figure 6:
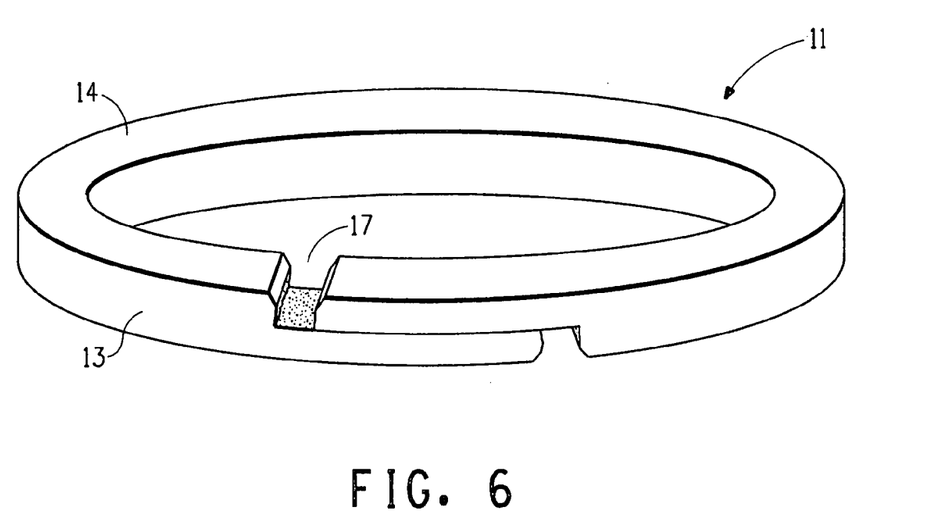
FIG. 6 shows the ring of FIG. 5 after sintering with the separator material removed and after the ring was snapped at the score marks to break the ring at those locations and provide the complete separation.

Various shapes of separator material can be used to form a circuitous path in a seal ring. The Figures illustrate some separator material configurations and the resulting separations. FIG. 1 shows a pressed ring 1 prior to sintering with the edges 2 of angled separator material exposed on the top 3 and the outer side 4 of ring 1. FIG. 2 shows ring 1 of FIG. 1 after sintering with the separator material removed and ring 1 slightly opened to more clearly show the separation 5. FIG. 3 shows a pressed ring 6 prior to sintering with the edges 7 of V-shaped separator material exposed on the top 8 and the outer side 9 of ring 6. FIG. 4 shows ring 6 of FIG. 3 after sintering with the separator material removed and ring 6 slightly opened to more clearly show the separation 10. FIG. 5 shows a pressed ring 11 prior to sintering with the edge 13 of a horizontal sheet of separator material 12 exposed on the outer side 13 of ring 11. The plane of the sheet separator material 12 is parallel to the surface of the top 14 of ring 11. The top and bottom surfaces of ring 11 are scored or notched at location 15 on the top 14 of the ring and location 16 on the bottom of the ring. Location 15 is directly above the one end of sheet separator material 12 and location 16 is directly below the opposite end of sheet separator material 12. FIG. 6 shows ring 11 of FIG. 5 after sintering with the separator material removed and after ring 11 was snapped at the score marks or notches to break the ring at those locations and provide the complete separation 17. Ring 11 is shown slightly opened to more clearly show the separation 17.

Separation formation using a fracturing technique produces a mating surface, but fracturing produces only simple butt joints, providing a much shorter path for fluid leakage than a mating, scarf joint. Neither machining nor fracturing can give an angled, overlapping joint with precise mating surfaces as achieved in the present invention. Machining can be used to provide angled joints, but the surfaces are not irregular as in the present invention. Fracturing produces precise complementary mating surfaces, but fracturing can't produce a joint with angled, overlapping geometry. The present invention provides angled joints having irregular surfaces and overlapping geometry with each side of the joint being precisely complementary to the other side. The irregular or rough surface provided in the present invention, coupled with each side being precisely complementary, is an advantage of the current invention because it provides additional protection against leakage. Materials suitable for use as separator materials comprise polymers, inorganics, metals, ceramics, fibrous materials such as paper, cardboard, or cloth, or composites.

Molding materials suitable for use in the present invention include powdered materials such as polymers, metals, and ceramics. Metal powders useful for the present invention would be those used in powdered metal technology, known to one skilled in the art. Such metal powders may include but are not limited to iron, steel, aluminum, copper, brass, bronze, or nickel.

A wide variety of polymers are suitable for use in the present invention, and may include but are not limited to: polyphenylenes, polyether sulfones, polyphenylene sulfones, polyphenylene sulfides, oxidized polyphenylene sulfides, polyimidothioethers, polyoxamides, polyimines, polysulfonamides, polyimides, polysulfonimides, polyimidines, polypyrazoles, polyisoxazoles, polybenzoxazoles, polybenzimidazoles, polythiazoles, polybenzothiazoles, polyoxadiazoles, polytriazoles, polytriazolines, polytetrazoles, polyquinolines, polyanthrazolines, polypyrazines, polyquinoxalines, polyquinoxalones, polyquinazolones, polytriazines, polytetrazines, polythiazones, polypyrrones, polyphenanthrolines, polycarbosilanes, and polysiloxanes, polyamides, polyesters, polyetherketones, polyetheretherketones, polyetherketoneketones, polyamideimides, polyetherimides, epoxy polymers, bismaleimide polymers, phenolic polymers, furan polymers, urea based polymers, unsaturated polyesters, epoxy acrylates, diallyl phthalates, vinyl esters, melamines, nylon polymers, liquid aromatic polyamides, liquid aromatic polyesters, polypropylenes, polyvinyl chlorides, vinyl on polymers, and fluoropolymers such as polytetrafluorethylenes or perfluoroalkoxies, liquid crystal polymers (LCP), urethanes, ethylenevinylalcohols, polyacrylates, polymethylmethacrylates, polyethylenes, chlorinated polyethylenes, polyacetal, polycarbonate, ethylene-tetrafluoroethylene copolymers, grafted polyphenylene ether resins, or mixtures, copolymers or blends thereof.

A polyimide is one preferred polymer

The polyimide contains the characteristic —CO—NR—CO— group as a linear or heterocyclic unit along the main chain of the polymer backbone. The polyimide can be obtained, for example, from the reaction of monomers such as an organic tetracarboxylic acid, or the corresponding anhydride or ester derivative thereof, with an aliphatic or aromatic diamine.

A polyimide precursor as used to prepare a polyimide is an organic polymer that becomes the corresponding polyimide when the polyimide precursor is heated or chemically treated. In certain embodiments of the thus-obtained polyimide, about 60 to 100 mole percent, preferably about 70 mole percent or more, more preferably about 80 mole percent or more, of the repeating units of the polymer chain thereof has a polyimide structure as represented, for example, by the following formula:

wherein $R_1$ is a tetravalent aromatic radical having 1 to 5 benzenoid-unsaturated rings of 6 carbon atoms, the four carbonyl groups being directly bonded to different carbon atoms in a benzene ring of the $R_1$ radical and each pair of carbonyl groups being bonded to adjacent carbon atoms in the benzene ring of the $R_1$ radical; and $R_2$ is a divalent aromatic radical having 1 to 5 benzenoid-unsaturated rings of carbon atoms, the two amino groups being directly bonded to different carbon atoms in the benzene ring of the $R_2$ radical.

Preferred polyimide precursors are aromatic, and provide, when imidized, polyimides in which a benzene ring of an aromatic compound is directly bonded to the imide group. An especially preferred polyimide precursor includes a polyamic acid having a repeating unit represented, for example, by the following general formula, wherein the polyamic acid can be either a homopolymer or copolymer of two or more of the repeating units:

wherein $R_3$ is a tetravalent aromatic radical having 1 to 5 benzenoid-unsaturated rings of 6 carbon atoms, the four carbonyl groups being directly bonded to different carbon atoms in a benzene ring of the $R_3$ radical and each pair of carbonyl groups being bonded to adjacent carbon atoms in the benzene ring of the $R_3$ radical; and $R_4$ is a divalent aromatic radical having 1 to 5 benzenoid-unsaturated rings of carbon atoms, the two amino groups being directly bonded to different carbon atoms in the benzene ring of the $R_4$ radical.

Typical examples of a polyamic acid having a repeating unit represented by the general formula above are those obtained from pyromellitic dianhydride ("PMDA") and diaminodiphenyl ether ("ODA") and 3,3',4,4'-biphenyltetracarboxylic dianhydride ("BPDA") and ODA. When subjected to ring closure, the former becomes poly(4,4'-oxydiphenylenepyromellitimide) and the latter becomes poly(4,4'-oxydiphenylene-3,3',4,4'-biphenyltetracarboxy imide).

A typical example of a polyimide prepared by a solution imidization process is a rigid, aromatic polyimide composition having the recurring unit:

wherein $R_5$ is greater than 60 to about 85 mole percent paraphenylene diamine ("PPD") units and about 15 to less than 40 mole percent metaphenylene diamine ("MPD") units.

The tetracarboxylic acids preferably employed in the practice of the invention, or those from which derivatives useful in the practice of this invention can be prepared, are those having the general formula:

wherein A is a tetravalent organic group and $R_6$ to $R_9$, inclusive, comprise hydrogen or a lower alkyl, and preferably methyl, ethyl, or propyl. The tetravalent organic group A preferably has one of the following structures:

wherein X comprises at least one of

As the aromatic tetracarboxylic acid component, there can be mentioned aromatic tetracarboxylic acids, acid anhydrides thereof, salts thereof and esters thereof. Examples of the aromatic tetracarboxylic acids include 3,3',4,4'-biphenyltetracarboxylic acid, 2,3,3',4'-biphenyltetracarboxylic acid, pyromellitic acid, 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, 2,2-bis(3',4'-dicarboxyphenyl)hexafluoropropane, 2,2-bis[4-(3,4-dicarboxyphenoxy)phenyl]propane dianhydride and bis(3,4-dicarboxyphenyl)sulfone.

These aromatic tetracarboxylic acids can be employed singly or in combination. Preferred is an aromatic tetracarboxylic dianhydride, and particularly preferred are 3,3',4,4'-biphenyltetracarboxylic dianhydride, pyromellitic dianhydride, 3,3',4,4'-benzophenonetetracarboxylic dianhydride, and mixtures thereof.

As an organic aromatic diamine, use is preferably made of one or more aromatic and/or heterocyclic diamines, which are themselves known to the art. Such aromatic diamines can be represented by the structure: $H_2N-R_{10}-NH_2$, wherein $R_{10}$ is an aromatic group containing up to 16 carbon atoms and, optionally, containing up to one hetero atom in the ring, the hetero atom comprising —N—, —O—, or —S—. Also included herein are those $R_{10}$ groups wherein $R_{10}$ is a diphenylene group or a diphenylmethane group. Representative of such diamines are 2,6-diaminopyridine, 3,5-diaminopyridine, meta-phenylene diamine, para-phenylene diamine, p,p'-methylene dianiline, 2,6-diamino toluene, and 2,4-diamino toluene.

Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenylsulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

Other useful diamines have at least one non-heteroatom containing aromatic rings or at least two aromatic rings bridged by a functional group.

These aromatic diamines can be employed singly or in combination. Preferably employed as the aromatic diamine component are 1,4-diaminobenzene, 1,3-diaminobenzene, 4,4'-diaminodiphenylether, and mixtures thereof.

Various fillers and additives may be used in combination with the polymer powder of the present invention. These may include, but are not limited to: glass fibers, ceramic fibers, boron fibers, glass beads, whiskers, diamond powders, alumina, or silica, natural mica, synthetic mica, alumina, carbon black, a silver powder, a copper powder, an aluminum powder, a nickel powder, aramide fibers, metal fibers, ceramic fibers, whiskers, silicon carbide, silicon oxide, alumina, a magnesium powder, a titanium powder, chopped carbon fibers, milled carbon fibers, graphite, fluorine-containing fine powders, sheet silicates, kaolinite, muscovite mica, talc, fluoropolymer, molybdenum disulfide, zinc oxide, tungsten carbide, silicone, carbon black, particulate polyimide, boron nitride, aramid, potassium titanate, barium titanate, and polytetrafluoroethylene (PTFE), and combinations thereof.

Powders of the present invention can be molded under various conditions of temperature and pressure. Typically to mold a powder and obtain a molded part of the present invention, sintering temperatures of from about 500° F. to about 3200° F. can be used alone or in combination with pressures in the range of from about 15,000 to about 120,000 pounds per square inch of part face surface. The hold time, that is the time that the powder is held at the appropriate molding conditions of temperature and pressure, can vary—depending on the process conditions or other variables—from about 1 minute to about 5 days.

Conventional molding equipment can be used to press the powders into parts of the present invention. Manual and/or automated procedures can be used, where appropriate.

EXAMPLES

Several rings having an outer diameter of 4 inches and a thickness of 0.15 inches was molded from a polyimide resin powder using an 80 ton PowderMate® hydraulic press and a tool set. A die was filled with the polyimide resin and, using tweezers or needle nose pliers, a pre-cut paper partition was inserted into the resin filled cavity. Printer paper 0.003 inch (0.07 mm) thick and stiffer, index card paper of 0.011 inch (0.27 mm thick were used. The partitions were pre-cut to the width of the ring wall thickness (OD minus ID) and of sufficient length so as to be able to contact the bottom punch with one end and allow the other, opposite end to just reach the top of the filled cavity, taking into account bends used to form the joint geometry. The simplest technique and first rings made used a straight partition (no bends) of 0.003 inch (0.07 mm) thick printer paper inserted at a constant angle into the resin filled cavity. This would form a corrugated diagonal partition in compression similar to that shown in FIG. 2. The corrugation effect was from the compression of the paper due to its less rigid property.

Additional rings were produced using variations in the geometry of the inserted partition to demonstrate the capability to form ring end joints that were more complicated than the diagonal partition described above. The heavier, more stiff 0.011 (0.27 mm) thick index card paper was also used to determine if the level of corrugation could be controlled by stiffness. "Z" and "V" configurations for the separator material were specifically tested. When inserting these configurations, some manual displacement of the resin in the cavity was needed to insert the partition and then return the resin to fill around the partition. The resin was then compressed with standard compaction forces to form the ring to standard compaction densities and comply with dimensional specifications.

After sintering and upon cooling, the ring ends where the partitions had been pressed were easily separated with a slight pull and twisting motion. The ring ends exhibited complimentary extrusions and recesses that nested precisely into each other. The sharpness and complex shapes formed could not be achieved using other known methods.

Additional rings were fabricated as an alternative approach to forming step gap rings, by using horizontal separator material to form a center separation positioned midway in the ring wall with the partition material exposed on the inner surface and the outer surface of the ring The horizontal separator material configuration is shown in FIG. 5.

Production of these rings were carried out by lowering the bottom punch to the half fill position; bringing the feed shoe forward to fill the half-position cavity; returning the feed shoe to the store (rear) position; lowering the lower punch to the full fill position; placing separator material consisting of a precut 0.003 inch (0.07 mm) thick paper horizontally on the resin; bringing the feed shoe forward again to complete the filling process; returning the feed shoe to the store position; lowering the upper punch to compression mold the ring, and ejecting the part.

The rings were all sintered under standard conditions where the cellulose paper product partitions were carbonized from the high heat in the oxygen depleted sintering cycle.

The rings with the horizontal separator material were scored on the faces of the ring as shown in FIG. 5. The score marks ensured the breaks would occur at the desired ends and sides. Using an axial bending force the rings were snapped at the score marks to create a step gap ring that combines separation technology and fracturing technology. The length of the steps varied from about 0.3 inch (0.7 cm) to about 3.5 inches (10 cm).

Therefore, paper less than 1 mm thick and less than 0.1 mm thick produced good separations.

Automatic ribbon feeding systems could be designed and fabricated into the press and more specifically through the die wall to automate the insertion of the partition material into the resin filled cavity. This process would not only automate the technology but would provide consistent preferred geometries having predictable tolerances. Other technologies can be used to automate the process. The partition material could also be optimized for stiffness versus thickness and minimize residual ash. For the step gap ring, the scoring of the ring surfaces would be accomplished by a raised line on the upper and lower punch faces.

What is claimed is:

1. A process for producing a seal ring with one or more complete separations in said seal ring, said process comprising:
   (a) filling a die cavity in one or more steps with a powdered polymer;
   (b) inserting into the die cavity after said filling, a separator material, having a thickness less than or equal to 1.0 mm, at one or more places at a location of desired separation of said seal ring;
   (c) compressing the powdered polymer and the separator material in a mold to form said seal ring;
   (d) removing said seal ring from said mold; and
   (e) removing said separator material from said seal ring;
   wherein said seal ring separations are complete separations; and wherein the opposing ends at the separation in the part have a rough, irregular surface with one end precisely complementary to the other, thereby providing a mating surface.

2. A process according to claim 1, wherein the separator material is in the form of a film or a sheet.

3. A process according to claim 1, wherein the separator material is in the form of a tube or column.

4. A process according to claim 1, wherein said powdered polymer comprises a material selected from the group consisting of a powdered metal, a powdered polymer, and a powdered ceramic.

5. A process according to claim 4, wherein said powdered polymer- comprises fillers and additives.

6. A process according to claim 4, wherein said powdered polymer comprises powdered polyimide.

7. A process according to claim 2 or 3, wherein the separator material comprises polymer, inorganic, metallic, ceramic, or fibrous material.

8. A process according to claim 4, wherein the separator material comprises fibrous material comprised of paper, cardboard or cloth.

9. A process according to claim 1, wherein sintering step is used to remove the separator material from the seal ring.

10. A process according to claim 8, wherein the separator material is flat, V-shaped, curved shaped, or pleated shaped.

11. A process according to claim 9, wherein the separator material has a thickness less than or equal to 0.1 mm.

12. A process according to claim 1, wherein the seal ring is formed using compression molding.

* * * * *